United States Patent [19]

Thompson et al.

[11] 4,247,883
[45] Jan. 27, 1981

[54] ENCAPSULATED CAPACITOR

[75] Inventors: David G. Thompson, Williamstown, Mass.; John T. Ogilvie, Bennington, Vt.

[73] Assignee: Sprague Electric Company, North Adams, Mass.

[21] Appl. No.: 929,760

[22] Filed: Jul. 31, 1978

[51] Int. Cl.³ .............................................. H01G 9/00
[52] U.S. Cl. .................................... 361/433; 361/306
[58] Field of Search ............... 361/433, 306, 308, 310; 339/277 R, 277 C, 278 R, 278 A

[56] References Cited

U.S. PATENT DOCUMENTS

| 2,086,033 | 7/1937 | Staley | 339/278 A |
|---|---|---|---|
| 2,820,934 | 1/1958 | Mullikin | 361/308 |
| 3,345,544 | 10/1967 | Metcalfe | 361/433 |
| 3,686,535 | 8/1972 | Piper | 361/433 |
| 3,828,227 | 8/1974 | Millard et al. | 361/433 |
| 3,855,505 | 12/1974 | Karlik et al. | 361/433 |
| 4,004,200 | 1/1977 | Johanson | 361/310 |
| 4,059,887 | 11/1977 | Galvagni | 29/570 |
| 4,064,611 | 12/1977 | Sobozenski et al. | 29/570 |
| 4,097,915 | 6/1978 | Locke | 361/433 |
| 4,158,218 | 6/1979 | McLaurin et al. | 361/308 |

*Primary Examiner*—James W. Davie
*Attorney, Agent, or Firm*—Connolly and Hutz

[57] ABSTRACT

An encapsulated chip capacitor is made by inserting capacitor bodies between two channels of L-shaped cross-section, electrically connecting the capacitor cathodes to one channel and the anodes to the other thus providing terminals, filling the resulting assembly with insulating encapsulant, curing it, and separating the cured assembly into individual chip capacitors.

5 Claims, 3 Drawing Figures

ENCAPSULATED CAPACITOR

BACKGROUND OF THE INVENTION

This invention relates to encapsulated chip capacitors. More particularly, it relates to an encapsulated solid electrolyte chip capacitor having external terminals which serve as channels during encapsulation.

Encapsulated chip capacitors with external terminals are known. Generally, these terminals are in the form of end caps which are fitted over the ends of the unit. With very small chip capacitors, however, the alignment and connection, both electrical and mechanical, of the end caps becomes a problem. Various methods have been proposed to overcome this problem including the use of jigs, for example as taught by Sobozenski and Stupak in U.S. Pat. No. 4,064,611, issued Dec. 27, 1977, which permits semi-automation of the assembly process. Another method is the placing of the unit in a metal casing, making the electrical connections, filling the casing with encapsulating material, and finally cutting away a section of the casing. Still another method involves inserting the leads through holes in the bottom of a non-conducting U-shaped channel which serves as the package, filling the channel with encapsulating material, and finally separating the units. In two of these methods at least one lead is threaded through a hole, which becomes more difficult as the size of the unit decreases. In the other method, a groove must be cut in the case to separate it into two sections which function as terminals. This cutting or grooving becomes more difficult with small units.

SUMMARY OF THE INVENTION

One of the purposes of this invention is to provide encapsulated chip capacitors that may be produced by automated assembly. Another aspect of the invention involves providing an encapsulated chip capacitor with terminals so designed as to not only function as terminals on the final capacitor but also to have served as the channel for the encapsulating material.

Both of these purposes can be attained by providing a pair of metal channels of substantially L-shaped cross-section. The channels are set facing each other but spaced apart so that the capacitor bodies will fit between them. The top and bottom edges of the channels may be bent inwardly to provide a better bond between the encapsulant and the metal terminals.

The capacitor bodies are inserted so that all the cathodes are adjacent one channel and all the anodes are adjacent the other. The electrical connections are made, and the encapsulating material is dispensed into the channel so that it flows completely around the individual bodies. After encapsulant curing, the units are cut apart into individual bodies.

BRIEF DESCRIPTION OF THE DRAWING

FIG. 1 shows a perspective view of a step in the process of assembling the capacitors. The elongated channels (21 and 22), sections of which are anode terminal (11) and cathode terminal (12), are spaced far enough apart for the capacitor bodies (13) to fit therebetween. The cathode attachments (14) are made by conductive adhesive or solder. The anode lead wires (18) attached to a common processing bar (not shown) are combed through the slots (15) and are welded to the channel adjacent the bottom of the slot, thus aligning the bodies, and the wires are removed. The bent edges or lips (17) of the channels become embedded in the encapsulant and lock the unit to it. Subsequently, the units are separated, e.g., by cutting or dicing, between the bodies as indicated by dashed lines (19) using anode slots (15) as offset alignment points.

In FIGS. 2, 11 and 12 are cathode and anode terminals, respectively, of substantially L-shaped cross-section which face each other. They have a horizontal and a vertical portion joined in a right angle along a common edge. A capacitor body (not shown) is disposed between them and electrically connected to them. Anode terminal (12) has a slot (15) to receive anode lead (18). In the preferred embodiment, the top and bottom edges of both terminals are bent inwardly forming lips (17) which are embedded in the encapsulant (16).

Referring to FIG. 3, anode terminal (11) and cathode terminal (12) are of substantially L-shaped cross-section, and face each other but are spaced from each other. A capacitor body (13) is positioned between them. The anode terminal has a slot (15) in the back portion thereof through which the anode lead (18) passes, and the anode attachment is made at the bottom portion of slot (15). The cathode attachment (14) is made to the other terminal. The capacitor body and that portion of the anode lead to the interior of the anode terminal is surrounded by encapsulating material (16) and bent portions (17) of the terminals are embedded in it. The encapsulant is not flush with the bottom portions of the terminals but is slightly elevated between them.

DESCRIPTION OF THE PREFERRED EMBODIMENTS

Figure 1:
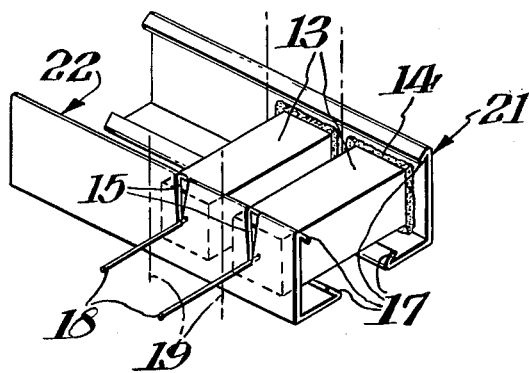
FIG. 1 is a view of capacitor bodies in the channel terminals before encapsulation.
Figure 2:
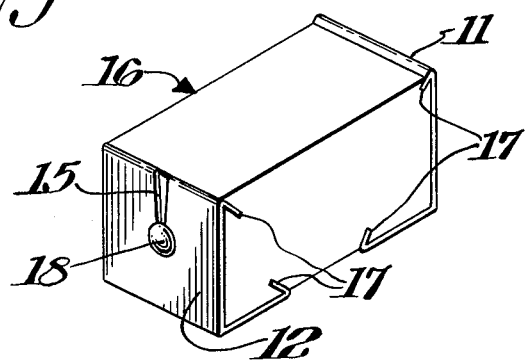
FIG. 2 is a perspective view showing the anode terminal.
Figure 3:
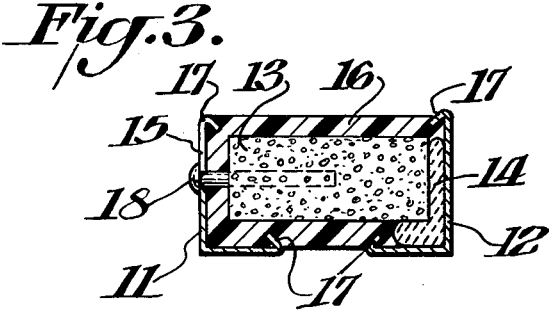
FIG. 3 is a lengthwise cross-sectional view of the preferred chip capacitor.

One method of making the encapsulated capacitors, two channels of substantialy L-shaped cross-section are placed on a base facing each other and spaced from each other for the admission of solid electrolyte-or other capacitor bodies. The base is a processing fixture constructed of material that is non-adherent to the encapsulating material. It may be a plate with a spacer between the terminals. The slot prevents encapsulant material from interfering with the attachment of terminals to circuit boards. Alternately, the fixture may be of one piece and formed with a raised portion down the middle to accomplish the same ends.

The channel which will serve as the anode terminal is slotted to receive anode lead wires of the capacitors, and the slot spacing along the channels corresponds to the spacing of the capacitors and anode wires attached to the processing bars. Thus, the slots serve also as alignment points for later separation of the units. The capacitors attached to this bar are inserted into the channels, and the cathode attachment is made. The latter may be accomplished by affixing conductive adhesive or solder to the cathode channel or/and the cathode end of the capacitor before insertion into the channel assembly under the bent lip of the cathode channel. The anode leads pass down through the slots and the leads are welded adjacent the bottom of the slot. If laser welding is used, the lead is cut at the same time it is welded. The processing bar may be removed at this time. Next, encapsulant is admitted to the channel assembly containing a plurality of capacitors in side-by-side relationship. The encapsulant is cured, and finally the individual units are separated, preferably by dicing, intermediate to each slot. The slots on the anode channel not only assure good metal-to-metal contact for the anode connection, particularly for welding, but also serve as reference points for the dicing operation.

The process permits the assembly of a plurality of units at a time and lends itself readily to automation.

The final capacitor itself has terminals which can be attached to circuits by usual means, e.g., reflow soldering, and which, because of the locking lips embedded in the encapsulant, does not peel away or otherwise separate from the encapsulant. Briefly, it has two terminals of substantially L-shaped cross-section, facing each other; the vertical portion of the anode terminal is slotted through the top edge partway down this portion. The top and bottom edges of both terminals are bent inwardly forming locking lips. Preferably, the capacitor body is attached to the cathode terminal via solder or conductive adhesive and to the anode terminal by welding the anode lead to the slot adjacent its lower end. However, the anode connection may also be made by conductive adhesive or soldering. The entire body is encapsulated, with the locking lips embedded in the encapsulant.

At the present time, encapsulating materials with the desired properties for use with capacitors do not adhere well to the metal of the terminals. The requirements the metal must meet is that it is solderable and weldable, e.g., nickel, copper alloys, gold-plated nickel, iron-nickel alloys, etc. The encapsulant must have a high enough viscosity to be retained by the channels on and around the capacitor bodies but still be able to flow into crevices and around corners. Alternately, a transfer molding process may be used to encapsulate the units. Obviously, the edges of the terminals need not be bent into the lips if the encapsulating material bonds well to metal, thus simplifying the manufacture of the terminals.

What is claimed is:

1. An encapsulated chip capacitor comprising a pair of terminals with a substantially L-shaped cross-section and each having a vertical plate and a horizontal plate meeting in a right angle along a common edge, a capacitor body with an anode and a cathode encapsulated in an insulating material and having an anode lead extending from one end thereof, one of said terminals electrically connected to said cathode and the other to said anode, said horizontal plate of each of said terminals facing each other and extending partway along the same side of said encapsulated body on the outside thereof contiguous therewith and spaced from each other, said vertical plates extending along the outside of opposite ends of said body and contiguous therewith, said vertical plate connected to said anode having a slot partway down said vertical plate from the top thereof toward the horizontal plate and recieving said anode lead.

2. An encapsulated chip capacitor according to claim 1 wherein the extremities of said horizontal and said vertical plates opposite said common edge are bent inwardly forming locking lips and said lips are embedded in said insulating material.

3. An encapsulated chip capacitor according to claim 2 wherein said locking lips of said vertical plate are embedded in said insulating material on the side opposite that bearing the horizontal plate and adjacent said ends.

4. An encapsulated chip capacitor according to claim 2 wherein said slot also extends through one of said locking lips and said anode lead is welded to said terminal adjacent the lower end of said slot.

5. An encapsulated chip capacitor according to claim 1 wherein said cathode is connected to its terminal by solder or conductive adhesive.

* * * * *